Sept. 29, 1964     D. M. HOLLABAUGH     3,150,652
INDUCTION SYSTEM HEATING DEVICE Filed Aug. 31, 1962     2 Sheets-Sheet 1

DONALD M. HOLLABAUGH
INVENTOR.

BY J. R. Faulkner
E. A. Beutler
ATTORNEYS

Sept. 29, 1964     D. M. HOLLABAUGH     3,150,652
INDUCTION SYSTEM HEATING DEVICE
Filed Aug. 31, 1962     2 Sheets-Sheet 2
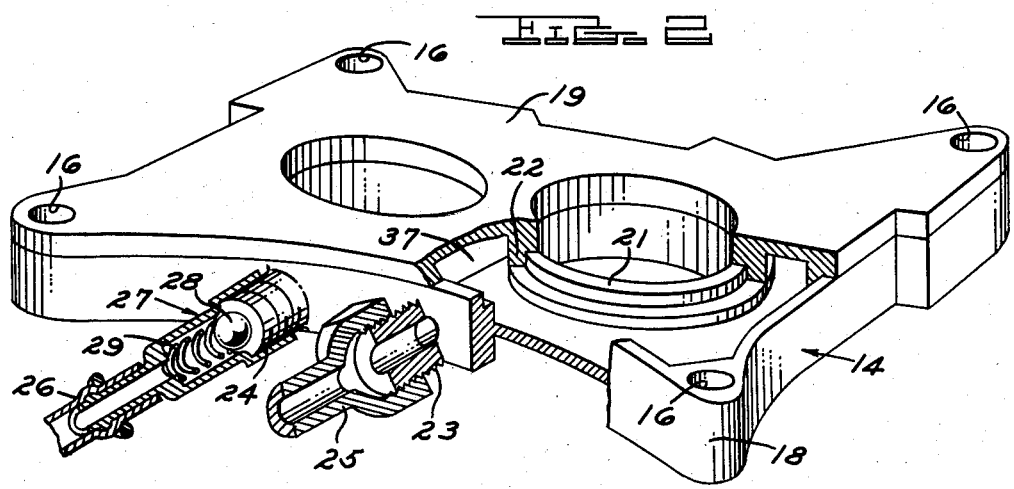
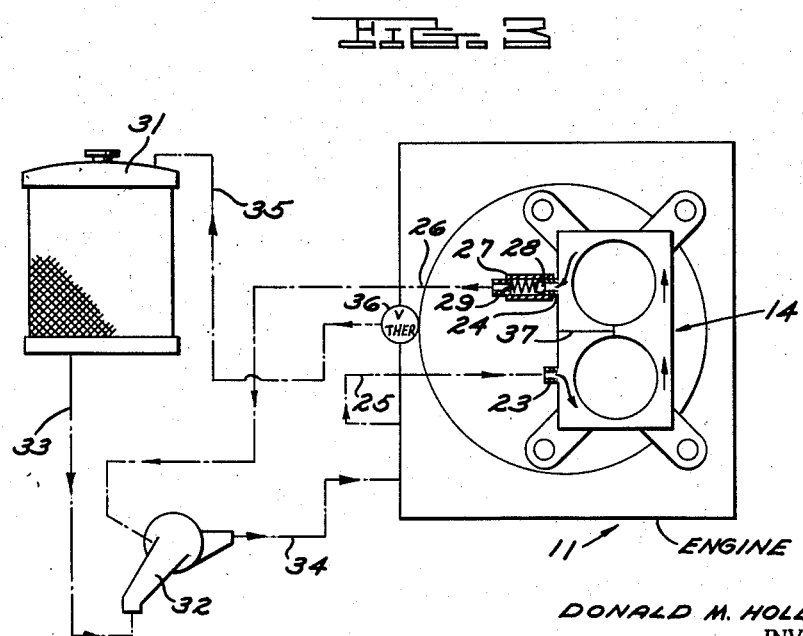
DONALD M. HOLLABAUGH
INVENTOR.
BY J. R. Faulkner
E. A. Beutler
ATTORNEYS

3,150,652
INDUCTION SYSTEM HEATING DEVICE
Donald M. Hollabaugh, Plymouth, Mich., assignor to Ford Motor Company, Dearborn, Mich., a corporation of Delaware
Filed Aug. 31, 1962, Ser. No. 220,742
9 Claims. (Cl. 123—122)

This invention relates to internal combustion engines and more particularly to a heating device for the induction system of an internal combustion engine.

It has been proposed to heat the induction system of an internal combustion engine to promote fuel vaporization. It has further been proposed to heat the intake manifold or the engine's charge forming device adjacent the throttle valves of the latter to prevent the icing which might otherwise occur under high humidity, low temperature conditions. Although it is desirable, particularly at low temperatures, to heat the induction system of the engine, too great a heat input can cause severe leaning of the fuel-air mixture. The leaning is most prevalent at idle speed or at speeds just off idle.

One common method of heating the induction system or charge forming device of an engine employs the circulation of the cooling fluid of the engine through a heat exchanging device positioned in heat exchanging relation to a portion of the induction system. In a liquid cooled engine, the operating temperature of the coolant frequently exceeds 180° F. Temperatures of this magnitude are sufficient to cause leaning out of the fuel-air mixture at low engine speeds. At higher engine speeds there is a sufficient rate of air flow to prevent leaning.

It is, therefore, the principal object of this invention to provide a heating device for the induction manifold of an internal combustion engine in which the flow of heating fluid is restrained under certain engine operating conditions.

It is still a further object of this invention to provide a heating device for the induction system of an internal combustion engine that employs the cooling liquid of the engine and in which the heat input to the induction system by the heating device is governed by the operating speed and temperature of the engine.

In an internal combustion engine embodying this invention a heating device is positioned in heat exchanging relation to a portion of the induction system of the engine. Fluid heated by the engine is circulated through the heat exchanging device and means are provided to restrain the circulation of the fluid in the heat exchanging device in response to changes in the characteristics of the fluid.

Further objects and advantages of this invention will become more apparent as this description proceeds particularly when considered in conjunction with the accompanying drawings, wherein:

FIGURE 2 is a perspective view, with parts shown in section, of the heating device of FIGURE 1.

FIGURE 3 is a schematic view of an internal combustion engine and its cooling system incorporating this invention.

Figure 1:
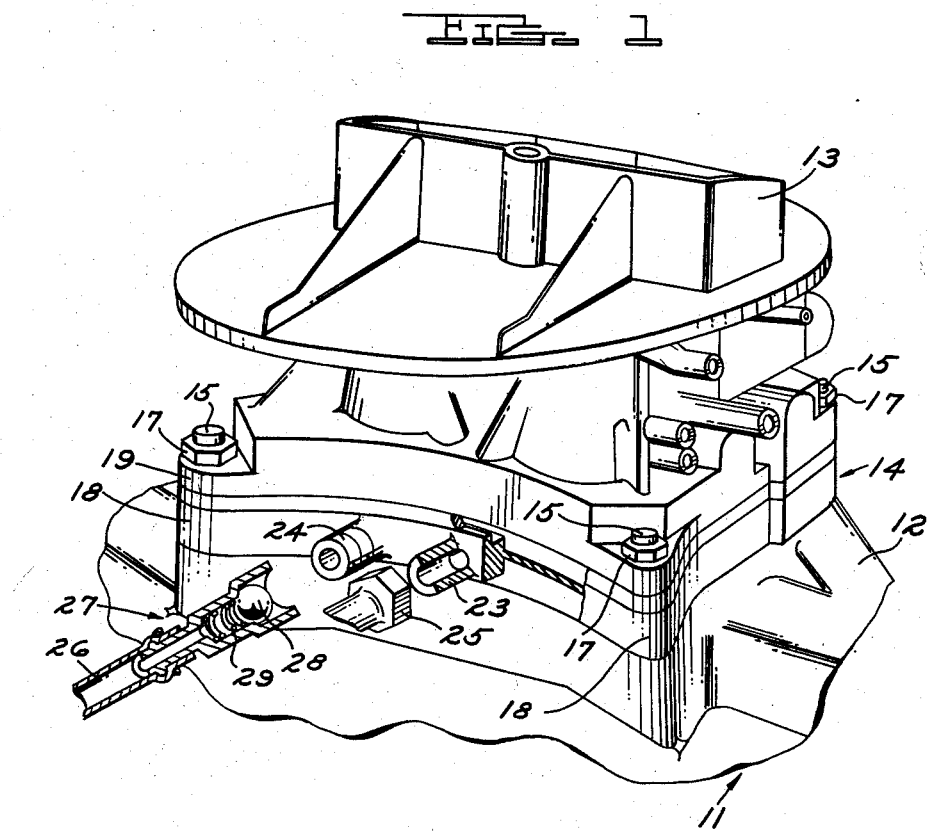
FIGURE 1 is a fragmentary, partially exploded, perspective view, with parts shown in section, of an internal combustion engine embodying this invention.

Referring now in detail to the drawings and in particular to FIGURE 1, there is shown generally at 11 an internal combustion engine having an intake manifold 12. Supported upon the intake manifold 12 is a carburetor or other charge forming device 13 adapted to supply a combustible mixture to the cylinders of the engine through the manifold 12.

Interposed between the carburetor 13 and the intake manifold 12 is a heating device indicated generally by the reference numeral 14. The heating device 14 is positioned adjacent to the throttle valves (not shown) of the carburetor 13. Studs 15, threaded into the intake manifold 12, pass through apertures 16 formed in the heating device 14 and complementary apertures formed in the mounting flange of the carburetor 13. Nuts 17 are threaded onto the studs 15 to secure the carburetor 13 and heating device 14 to the intake manifold 12.

The heating device 14, shown in greater detail in FIGURE 2, comprises a lower plate 18 and an upper plate 19. The two-piece construction of the heating device 14 permits its water passage to be formed without the use of cores. The lower plate 18 has upstanding walls 21 that dove-tail with downward projecting walls 22 of the upper plate 19 when the plates are secured together. The inner surfaces of the walls 21 and 22 are cylindrical and are concentric with the adjacent induction passages of the carburetor 13 and intake manifold 12 to form uninterrupted induction passages.

A water inlet fitting 23 is formed in one side of the front face of the lower plate 18 and a water outlet fitting 24 is formed in the other side of the front face of the lower plate 18. A water inlet conduit 25 connects the water inlet fitting 23 with the cooling system of the engine and a water outlet conduit 26 connects the water outlet fitting 24 with the cooling system.

Disposed in the outlet conduit 26 is a spring biassed check valve indicated generally at 27. The check valve 27 comprises a ball 28 urged by a coil spring 29 into seating relation with the opening in the outlet fitting 24.

The engine and its cooling system are shown schematically in FIGURE 3. Arrows indicate the direction of coolant flow. The cooling system comprises a cooling radiator, identified by the numeral 31, and an engine driven water pump, identified by the numeral 32. A conduit 33 interconnects the radiator 31 with the intake side of the water pump 32. The water pump 32 discharges through a conduit 34 into the cooling jacket of the engine at a pressure that is dependent upon engine speed.

A conduit 35 connects the cooling jacket of the engine with the radiator 31. A thermostatic valve 36 is positioned within the conduit 35 to preclude the flow of cooling liquid into the radiator 31 until the engine 11 has reached its operating temperature. When the thermostatic valve 36 is closed, water flows at a restricted rate from the cooling jacket to the inlet of the water pump 32 through a bypass (not shown).

The water inlet conduit 25 interconnects the inlet fitting 23 of the heating device 14 with the cooling system of the engine. The water outlet conduit 26 interconnects the outlet fitting 24 of the heating device 14 with the inlet side of the pump 32 or with the outlet of the cooling jacket. A transverse wall 37 formed in the lower plate 18 of the heating device 14 causes the internal flow of cooling liquid in the heating device 14 to encircle the induction passages formed therein.

*Operation*

Normally, water flows from the water pump 32 through the conduit 34 to the cooling jacket of the engine 11. The rate of water flow is dependent upon the speed of the engine. From the cooling jacket the water flows through the open thermostatic valve 36 into the cooling radiator 31 through the conduit 35. The water cooled in the radiator 31 is returned to the intake side of the water pump 32 through the conduit 33.

A portion of the circulating water may flow through the inlet conduit 25 into the heating device 14 to heat the mixture flowing into the intake manifold 12. From the heating device 14 the water may return to the water pump 32 through the check valve 27 and outlet conduit 26.

When the engine 11 reaches normal operating temperature, less heating of the intake manifold 12 is required. In fact, when the engine is at idle or slightly off idle speeds, excess heat applied to the intake manifold 12 will cause severe leaning out of the mixture and unsatisfactory engine operation. The check valve 27 is provided to restrict the rate of water flow under such circumstances. The calibration of the coil spring 29 is such that the ball 28 will be normally maintained seated until the pressure in the cooling system exceeds a predetermined amount. A pressure is selected that is approximately equal to the pressure generated in the cooling system by the water pump 32, when driven at engine idling speed, and when the thermostatic valve 36 is opened. If the thermostatic valve 36 closes, sufficient back pressure will be generated in the system to open the check valve 27 and permit water to flow through the heating device 14. Alternatively, if the engine is operating at a speed that is above normal idle operating speed, the discharged pressure of the water pump 32 will be sufficient to open the check valve 27.

The check valve 27, therefore, will be opened under the following circumstances:

When the engine is idling at a greater than normal speed.

When the engine is idling at normal speed and the thermostatic valve 36 is closed.

When both the aforementioned factors are present.

It should be readily apparent that in a thoroughly warmed engine operating at normal idle speed there will be no heat supplied to the intake manifold 12 by the heating device 14. During warm up of a cold engine, however, the thermostatic valve 36 will be closed, causing the check valve 27 to open and permit the heating device 14 to operate. In addition, most carburetors incorporate a fast idle device to increase the idle speed of the engine when the choke valve is closed. The greater than normal idle speed thus provided will additionally insure that the check valve 27 will be open and heat will be supplied to the intake manifold 12. By placing the check valve 27 on the discharge side of the heating device 14, it is further insured that the heating device 14 will be constantly filled with water.

It is to be understood that this invention is not to be limited to the exact construction shown and described, but that various changes and modifications may be made without departing from the spirit of the invention. For example, it would be possible to form the heating device 14 integral with the charge forming device of the engine. Other changes and modifications may be made without departing from the spirit and scope of the invention, as defined by the appended claims.

I claim:

1. An internal combustion engine comprising an induction system for conveying air to the cylinders of said engine, a cooling medium for dissipating heat generated by the operation of said engine, a pump for circulating said cooling medium, a heat exchanging device positioned in heat exchanging relation with a passage of said induction system, conduit means for circulating said cooling medium through said heat exchanging device, and means restraining the circulation of said cooling medium through said heat exchanging device in response to changes in the speed of said engine.

2. An internal combustion engine comprising a charge forming device, an induction manifold for conveying a combustible mixture from said charge forming device to the cylinders of said engine, a heat exchanging device positioned in heat exchanging relation to a passage of said induction manifold contiguous to said charge forming device to heat the combustible mixture supplied by said charge forming device, a cooling medium for dissipating heat generated by said engine, a pump for circulating said cooling medium, conduit means for circulating said cooling medium in said heat exchanging device, and means restraining the circulation of said cooling medium through said heat exchanging device in response to changes in the speed of said engine.

3. A heating device for the induction system of an internal combustion engine comprising a heat exchanging device positioned in heat exchanging relation with a passage of said induction system, a fluid heated by the engine, a pump for circulating said fluid, conduit means for circulating said fluid through said heat exchanging device, and pressure responsive means for restraining the flow of fluid through said heat exchanging device when the pressure of said fluid is below a predetermined value.

4. A heating device for the induction system of a liquid cooled internal combustion engine comprising a jacket surrounding at least a portion of said induction system, liquid inlet means for said jacket, liquid outlet means for said jacket, and pressure responsive valve means in said liquid outlet means for closing said outlet means when the liquid pressure in said jacket falls below a predetermined value.

5. An internal combustion engine comprising an induction manifold for conveying air to the cylinders of said engine, a liquid cooling jacket surrounding a portion of said engine, a pump adapted to circulate cooling liquid through said liquid cooling jacket, a heat exchanging device positioned in heat exchanging relation to at least a portion of said induction manifold, conduit means interconnecting said pump with said heat exchanging device for circulating cooling liquid through said heat exchanging device, and pressure responsive valve means in said conduit for restraining the flow of cooling liquid through said heat exchanging device when the liquid pressure in said conduit falls below a predetermined value.

6. An internal combustion engine comprising an induction manifold for conveying air to the cylinders of said engine, a liquid cooling jacket surrounding a portion of said engine, a liquid pump driven by said engine and adapted to circulate liquid at a pressure that is dependent upon engine speed, first conduit means interconnecting said pump and said liquid cooling jacket for circulating cooling liquid through said cooling jacket, a heat exchanging device positioned in heat exchanging relation to at least a portion of said induction manifold, second conduit means interconnecting said pump with said heat exchanging device for circulating cooling liquid through said heat exchanging device, pressure responsive valve means in said second conduit means for retarding the flow of cooling liquid through said heat exchanging device when the liquid pressure in said second conduit falls below a predetermined value, and thermostatic valve means in said first conduit means for restricting the flow of cooling liquid through said liquid cooling jacket and for increasing the pressure in said second conduit means when the liquid temperature falls below a predetermined value.

7. An internal combustion engine comprising an induction system for conveying air to the cylinders of said engine, a cooling medium for dissipating heat generated by the operation of said engine, a heat exchanging device positioned in heat exchanging relation with a passage of said induction system, means for circulating said cooling medium through said heat exchanging device, and means for regulating the circulation of cooling medium through said heat exchanging device, said last named means being responsive to the speed of said engine for providing a first rate of circulation when said engine is operating below a predetermined speed and a substantially different rate of circulation when said engine is operating above the predetermined speed.

8. An internal combustion engine comprising an induction system for conveying air to the cylinders of said engine, a cooling medium for dissipating heat generated by the operation of said engine, a heat exchanging device positioned in heat exchanging relation with a passage of said induction system, means for circulating said cooling medium through said heat exchanging device, and means for precluding the circulation of said cooling medium through said heat exchanging device until the speed of said engine exceeds the predetermined value.

9. An internal combustion engine comprising an induction system for conveying air to the cylinders of said engine, a cooling medium for dissipating heat generated by the operation of said engine, a heat exchanging device positioned in heat exchanging relation with a passage of said induction system, means including conduit means for circulating said cooling medium through said heat exchanging device, and pressure responsive means for regulating the circulation of said cooling medium through said heat exchanging device, said pressure responsive means being operative to provide a first rate of circulation when the pressure in said conduit is below a predetermined value and a substantially different rate of circulation when the pressure in said conduit is above said predetermined value.

References Cited in the file of this patent

UNITED STATES PATENTS

| | | |
|---|---|---|
| 1,598,289 | Lee | Aug. 31, 1926 |
| 1,824,926 | Pokorny | Sept. 29, 1931 |
| 2,949,103 | Carlton | Aug. 16, 1960 |
| 3,053,241 | Platner | Sept. 11, 1962 |